United States Patent [19]

Miyoshi

[11] Patent Number: 4,686,159

[45] Date of Patent: Aug. 11, 1987

[54] LAMINATED LAYER TYPE FUEL CELL

[75] Inventor: Hideaki Miyoshi, Kobe, Japan

[73] Assignee: Mitsubishi Denki Kabushiki Kaisha, Tokyo, Japan

[21] Appl. No.: 895,722

[22] Filed: Aug. 12, 1986

[30] Foreign Application Priority Data

Aug. 13, 1985 [JP] Japan .................. 60-179632

[51] Int. Cl.4 ............................. H01M 8/24
[52] U.S. Cl. ........................ 429/39; 429/26
[58] Field of Search ......... 429/38, 39, 26, 34, 429/35, 36, 37

[56] References Cited

U.S. PATENT DOCUMENTS

| | | | |
|---|---|---|---|
| 3,573,102 | 3/1971 | Lane et al. | 429/39 |
| 3,573,104 | 3/1971 | Snyder et al. | 429/39 |
| 3,994,748 | 11/1976 | Kunz et al. | 429/34 |
| 4,276,355 | 6/1981 | Kothman | 429/26 |
| 4,292,379 | 9/1981 | Kothmann | 429/12 |
| 4,383,009 | 5/1983 | Kothman | 429/39 |
| 4,407,904 | 10/1983 | Uozumi et al. | 429/39 |

FOREIGN PATENT DOCUMENTS 58-163181  9/1983  Japan .

*Primary Examiner*—Donald L. Walton
*Attorney, Agent, or Firm*—Leydig, Voit & Mayer

[57] ABSTRACT

A laminated layer type fuel cell is formed of rectilinear and zigzag portions of channels formed in at least one selected from a group consisting of the gas separation plates, fuel electrode and oxidizer electrodes, thereby equalizing the electrochemical reaction, improving the cell characteristics, and the uniformity of the temperature distribution of the laminate layer type fuel cell.

3 Claims, 3 Drawing Figures

LAMINATED LAYER TYPE FUEL CELL

BACKGROUND OF THE INVENTION

This invention relates to a laminated layer type fuel cell and, more particularly, to the configuration of channels of a gas separation plate or an electrode substrate.

FIG. 1 is a perspective view showing a prior-art laminated layer type fuel cell disclosed, for example, in Japanese Patent Application Laid-open No. 58-163181. In FIG. 1, numeral 1 designates a gas separation plate, in which rectilinear fuel channels 1a and oxidizer channels 1b of rectangular-shaped cross section are formed in perpendicular directions to one another on the upper and lower surfaces of the gas separation plate 1. Numeral 2 designates cells which are each formed of a fuel electrode, an electrolyte matrix and an oxidizer electrode mounted in operation between the two gas separation plates 1. A laminated layer type fuel cell includes the gas separation plates 1 and the cells 2 sequentially laminated one after another. Arrows A and B respectively designate the directions of flow of the fuel and the oxidizer.

The operation of the laminated layer type fuel cell will be explained herebelow.

The fuel and the oxidizer supplied to the fuel channels 1a and the oxidizer channels 1b, respectively, are converted by the electrochemical reaction of the cells 2 into electric power. The current supplied by the cell reaction depends upon the partial pressures of the reaction components in the fuel and the oxidizer and increases as the partial pressures are higher.

Since the prior-art laminated layer type fuel cell is constructed as described above, the current varies according to the cell reaction which depends upon the partial pressures of the fuel and the oxidizer reaction gases. For example, since the partial pressure of the reaction gases are high in the portions corresponding to the fuel and oxidizer inlets of the fuel channels 1a and the oxidizer channels 1b, the flowing current is large. On the contrary, since the reaction gases are being consumed along the channels, at the upstream side of both channels, the partial pressures of the reaction gases decrease (i.e. especially in the portions corresponding to the fuel and oxidizer outlets of the fuel channels 1a and the oxidizers channels 1b), resulting in a small current. Accordingly, there arises problems that the electrochemical reaction in the cells become uneven with the result that the temperature distribution in the cells become irregular.

SUMMARY OF THE INVENTION

This invention has been made in order to eliminate the disadvantages described above, and has for its object to provide a laminated layer type fuel cell which can improve the cell characteristics by equalizing the cell reactions and the temperature distribution in the cells.

The laminated layer type fuel cell according to this invention comprises gas separation plates, each having rectilinear and zigzag portions of fuel and oxidizer channels sandwiched between cells formed of fuel electrodes, electrolyte matrices, and oxidizer electrodes so as to equalize the cell reactions in the cells.

DESCRIPTION OF THE PREFERRED EMBODIMENT

Figure 1:
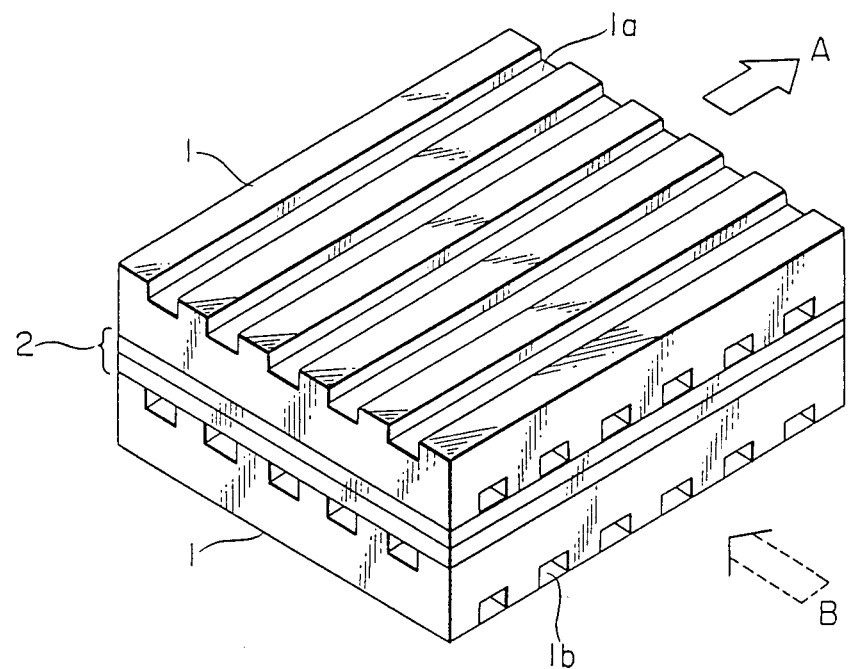
FIG. 1 is a perspective view showing a prior-art laminated layer type fuel cell.
Figure 2:
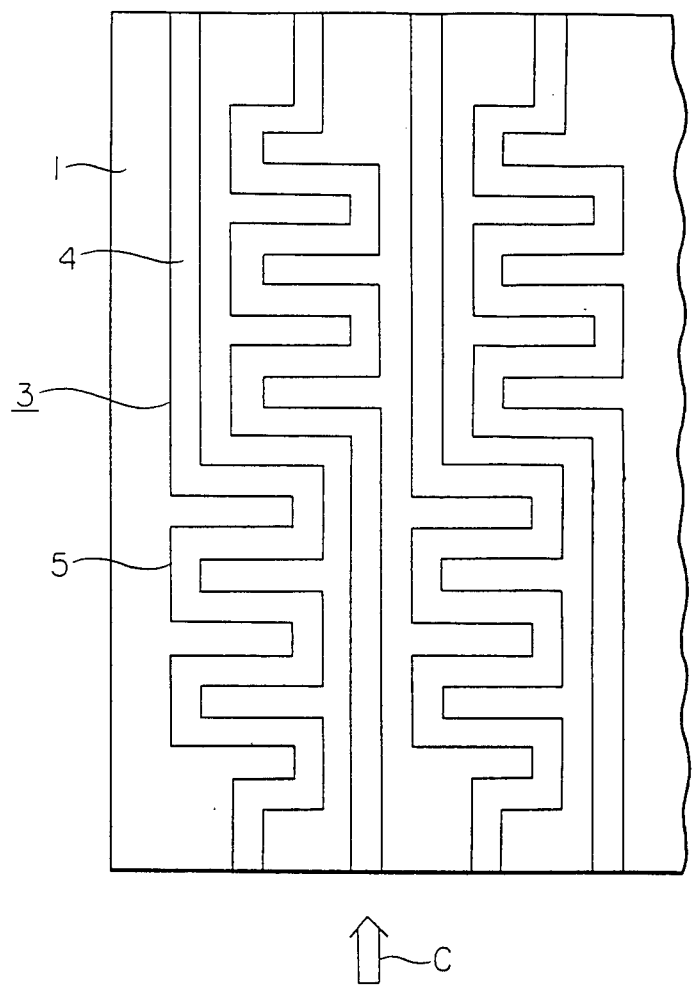
FIG. 2 is a plan view showing the gas separation plate of an embodiment of a laminated layer type fuel cell according to the present invention.

An embodiment of this invention will be described with reference to the drawings. FIG. 2 shows an embodiment of the present invention. In FIG. 2, numeral 1 designates a gas separation plate, and numeral 3 designates fuel and oxidizer, channels having rectilinear portions 4 and zigzag portions 5. Symbol C designates the direction of flowing reaction gas of fuel or oxidizer. The length ratio of the rectilinear portions 4 to the zigzag portions 5 is, for example, 1:1, and the zigzag portions 5 are alternatively disposed at the upstream and downstream sides for reaction gas.

The operation of the laminated layer type fuel cell will be explained herebelow.

In the fuel cell in which the zigzag portions 5 of the fuel channels 3 formed in the fuel separation plate 1 are disposed at the upstream side of the reaction gases, the reaction gases are consumed by the cell reaction while the reaction gases pass the zigzag portions 5, the partial pressures of the reaction gases produced by the electrochemical reaction are decreased and the reaction gases are exhausted through the rectilinear portions 4 rapidly from the outlet of the gas channels 3. On the other hand, in the fuel cell in which the rectilinear portions 4 are disposed at the upstream side of the reaction gases, the time that the reaction gases pass the rectilinear portions 4 is shorter than the time that the reaction gases pass the zigzag portions 5. Thus, the reaction gases are fed into the zigzag portions 5 in the state that the decrease in the partial pressures so of the reaction gases is less, and the reaction gas is consumed by the cell reaction while passing the zigzag portions 5. Therefore, since the cell reaction mainly occurs in the zigzag portions 5 of the fuel channels 3 of the reaction gases, the cell reaction can be uniformly performed in the cells by alternatively disposing the zigzag portions 5 at the upstream and downstream sides.

In the embodiment described above, the length ratio of the rectilinear portions 4 to the zigzag portions 5 of the fuel channels 3 is 1:1. However, this invention is not limited to this particular embodiment. For example, the ratio of the lengths of the rectilinear portions 4 to the zigzag portion 5 may be 2:1 to 4:1 or any other arbitrary ratio.

Figure 3:
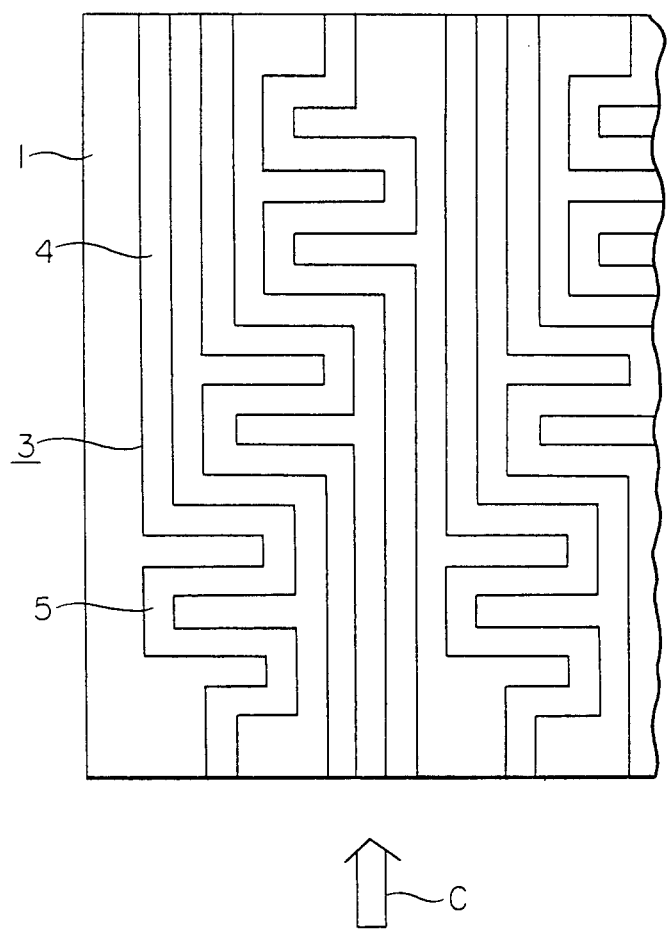
FIG. 3 is a plan view showing another example of a gas separation plate of the invention.

FIG. 3 is a plan view showing another embodiment of a laminated layer type fuel cell in which the length ratio of the rectilinear portions 4 to the zigzag portions 5 of the fuel channels 3 is 2:1 and the zigzag portions are sequentially displaced in every channel. The fuel channels 3 are advantageous to equalize the gas reaction in the cells in the same manner or higher than the previous embodiment.

In the embodiment described above, the case that the rectilinear portions and the zigzag portions are formed in the gas separation plate has been explained. However, this invention is not limited to the particular embodiment. For example, this invention may be applied to the fuel channels of the electrode substrate formed with reaction gas channels in at least one of the fuel electrode or oxidizer electrode of the electrode substrate, so-called ribbed electrode substrate.

The configuration of the channels in this invention may be applied to one or both of the fuel side channel and the oxidizer side channel.

As set forth above, according to this invention, the channels of the reaction gas are formed of the rectilinear portions and the zigzag portions and the cell reaction can be uniformly conducted within the cells. Therefore, the consumption of the reaction gas in the rectilinear portions is less along the rectilinear portion gas channels disposed at the upstream side, and higher reaction partial pressure can be supplied to the downstream side. Thus, the cell reaction may be effectively performed even at the downstream side. Consequently, the laminated layer type fuel cell in which the cell characteristics are improved and the temperature distribution is uniform can be provided.

What is claimed is:

1. A laminated layer type fuel cell for converting electrochemical reaction of fuel and oxidizer into electric power, said fuel cell comprising a plurality of gas separation plates, each having rectilinear and zigzag portions of fuel and oxidizer channels and a plurality of electrode cells sandwiched between said gas separation plates and sequentially laminated, each formed of a fuel electrode, an electrolyte matrix, and an oxidizer electrode whereby partial pressures of reaction gases produced by the electrochemical reaction are equalized throughout the cell to equalize cell reactions and temperature distribution in the cell.

2. A laminated layer type fuel cell as claimed in claim 1 wherein the rectilinear and zigzag portions of fuel and oxidizer channels have a length ratio of 1:1 and the zigzag portions are alternately disposed at upstream and downstream sides of the reaction gases.

3. A laminated layer type fuel cell as claimed in claim 1 wherein the rectilinear and zigzag portions of fuel and oxidizer channels have a length ratio of 2:1 to 4:1 and the zigzag portions are sequentially displaced with respect to each channel.

* * * * *